United States Patent
Traywick et al.

(10) Patent No.: US 12,388,817 B2
(45) Date of Patent: Aug. 12, 2025

(54) DYNAMIC PASSIVE AUTHENTICATION

(71) Applicant: Bank of America Corporation, Charlotte, NC (US)

(72) Inventors: Edward Lee Traywick, Bellbrook, OH (US); Christopher D. Nobile, Charlotte, NC (US); Joshua R. Johnson, Denver, NC (US); Christopher Stephen Littrell, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 233 days.

(21) Appl. No.: 18/097,729

(22) Filed: Jan. 17, 2023

(65) Prior Publication Data
US 2024/0244048 A1 Jul. 18, 2024

(51) Int. Cl.
*H04L 9/40* (2022.01)
*G06F 21/31* (2013.01)
*G06F 21/32* (2013.01)
*H04L 9/32* (2006.01)

(52) U.S. Cl.
CPC .......... *H04L 63/0861* (2013.01); *G06F 21/31* (2013.01); *G06F 21/32* (2013.01); *H04L 9/3231* (2013.01); *H04L 63/102* (2013.01)

(58) Field of Classification Search
None
See application file for complete search history.

(56) References Cited

U.S. PATENT DOCUMENTS

| | | | |
|---|---|---|---|
| 5,229,764 A | 7/1993 | Matchett et al. | |
| 8,370,639 B2 | 2/2013 | Azar et al. | |
| 9,648,015 B1 * | 5/2017 | Avetisov | H04L 9/3231 |
| 9,686,272 B2 * | 6/2017 | Blinn | H04L 63/0861 |
| 10,114,937 B2 | 10/2018 | Bassenye-Mukasa et al. | |
| 10,867,021 B1 | 12/2020 | Shelton et al. | |
| 11,328,280 B1 * | 5/2022 | Tougas | G06Q 20/206 |
| 11,334,654 B2 * | 5/2022 | Richman | G06V 10/70 |
| 11,341,349 B2 * | 5/2022 | Wu | H04L 63/0861 |
| 11,514,142 B2 | 11/2022 | Khitrov et al. | |

(Continued)

FOREIGN PATENT DOCUMENTS

| | | | | |
|---|---|---|---|---|
| EP | 2439613 A1 * | 4/2012 | | G06F 21/32 |
| JP | 2004054395 A * | 2/2004 | | |

*Primary Examiner* — Lashonda Jacobs-Burton
(74) *Attorney, Agent, or Firm* — Banner & Witcoff, Ltd.

(57) ABSTRACT

Arrangements for providing dynamic passive authentication are provided. In some aspects, registration data may be received for a plurality of users. The registration data may include biometric data of each user of the plurality of users, and identification of one or more user computing devices that each user is authorize to access. In response to receiving an indication of login to a user computing device by a first user, one or more passive authentication functions may be activated and biometric data may be received from devices associated with the user computing device. The computing platform may compare the received biometric data to registration biometric data associated with the first user. If the received data matches the registration data, the system may capture additional biometric data at a subsequent time. If the received data does not match the registration data, one or more mitigation actions may be identified and executed.

20 Claims, 10 Drawing Sheets

(56) References Cited

U.S. PATENT DOCUMENTS

| | | | | |
|---|---|---|---|---|
| 2005/0177735 | A1* | 8/2005 | Arnouse | G06F 21/32 |
| | | | | 713/186 |
| 2010/0148922 | A1* | 6/2010 | Yamada | G06F 21/32 |
| | | | | 340/5.82 |
| 2016/0283703 | A1* | 9/2016 | Allyn | H04L 63/0861 |
| 2017/0013462 | A1* | 1/2017 | Jangi | H04W 12/062 |
| 2017/0279800 | A1* | 9/2017 | Castinado | G06F 21/32 |
| 2019/0073045 | A1* | 3/2019 | Lei | H01H 13/705 |
| 2020/0380113 | A1* | 12/2020 | Bock | G06F 21/40 |
| 2021/0336940 | A1* | 10/2021 | Aslaksen | H04L 63/08 |
| 2022/0114244 | A1* | 4/2022 | Richman | G06V 40/1365 |
| 2023/0050957 | A1* | 2/2023 | Wang | H04W 12/06 |
| 2023/0205867 | A1* | 6/2023 | Meade | G06F 21/32 |
| | | | | 726/19 |
| 2023/0344827 | A1* | 10/2023 | Mays | H04L 63/0861 |
| 2024/0171410 | A1* | 5/2024 | Arora | H04L 9/3271 |

* cited by examiner

400

Passive Authentication Failed

Please Provide Additional Authentication

Username:

Password:

CANCEL    OK

Passive Authentication Failed

Additional Biometric Data is Currently

Being Capture For Additional Authentication

CANCEL    PROCEED

FIG. 5

DYNAMIC PASSIVE AUTHENTICATION

BACKGROUND

Aspects of the disclosure relate to electrical computers, systems, and devices for passively authenticating users of computing devices associated with an enterprise organization.

Enterprise organizations have employees who use or operate one or more computing devices during the course of business. In order to access these computing devices, a user may input authentication credentials, such as a username and password, to be authenticated to the computing device. While these arrangements provide a measure of assurance that a user is authorized to operate or access a computing device at login, these arrangements provide no way of ensuring that another user has not accessed the computing device after the time of initial login. Rather, access to the computing device is based on the initial login credentials. In some examples, unauthorized actors may operate a computing device (e.g., if a user steps away from the computing device) without necessary permissions and without detection.

In still other examples, many industries are struggling to identify and control the use of proxy workers or unauthorized subcontracting of work. Conventional systems that authenticate a user at login only may enable the use of proxy workers or unauthorized subcontracting by authorized users providing login credentials to the proxy or unauthorized worker.

Accordingly, it would be advantageous to provide arrangements for additional, passive authentication as the user continues to operate the computing device.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with authenticating users to ensure unauthorized users are not accessing particular devices or systems.

In some aspects, registration data may be received for a plurality of users. The registration data may include biometric data of each user of the plurality of users, as well as identification of one or more user computing devices that each user is authorize to operate or access. In some arrangements, an indication of a login by a first user to a user computing device may be received. In response to receiving the indication of login, one or more passive authentication functions may be initiated or activated. In some examples, passive authentication may include authenticating a user without requiring or receiving input from the user (e.g., biometric data may be captured as the user interacts with one or more devices and without the user proactively providing the biometric data (e.g., with user permission)).

In some examples, biometric data may be received from one or more hardware-based biometric data collection devices associated with the user computing device. For instance, a web camera, keyboard, mouse, or the like, may capture biometric data and the biometric data may be received by a computing platform. The computing platform may compare the received biometric data to registration biometric data associated with the first user. If the received biometric data matches the registration biometric data of the first user, the system may capture or collect additional biometric data at a subsequent time for analysis.

If the received biometric data does not match the registration biometric data of the first user, one or more mitigation actions may be identified. For instance, mitigation actions such as requesting additional authentication data, initiating capture of additional types of biometric data, locking the first user out of the user computing device, or the like, may be identified. The computing platform may generate an instruction or command causing execution of the one or more mitigation actions and may transmit the instruction or command to the user computing device for execution.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4 and 5 illustrate example user interfaces that may be generated in accordance with one or more aspects described herein.

DETAILED DESCRIPTION

Figure 1A:
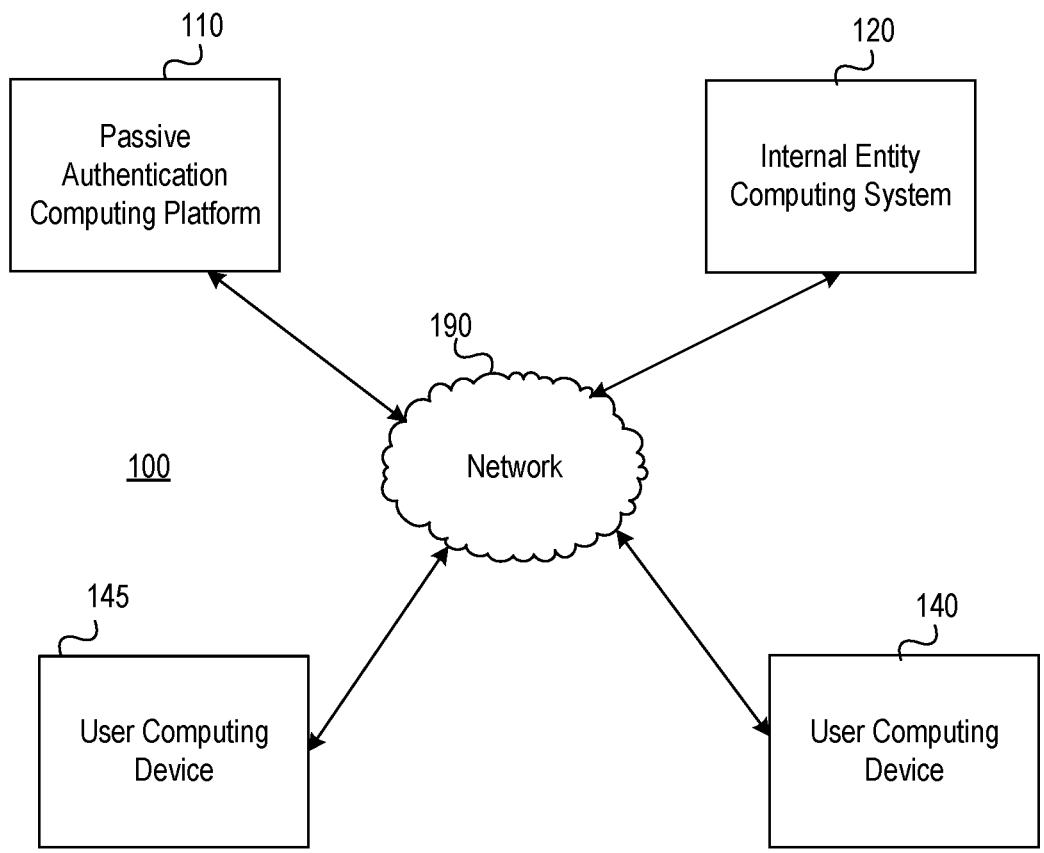
FIGS. 1A and 1B depict an illustrative computing environment for implementing passive authentication in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, conventional systems generally require users to provide login credentials at the start of a computing session to authenticate the user and provide access to a user computing device, associated systems and applications, and the like. However, these arrangements in which a user is authenticated only at the start of the computing session may enable unauthorized actors to access a user computing device if a user steps away from the user computing device, or may enable the use of proxy workers or unauthorized subcontractors.

Accordingly, aspects described herein provide for additional authentication of a user through biometric data captured as the user interacts with the user computing device, one or more user input devices, or the like (e.g., during the normal course of business, throughout a computing session, or the like). As discussed more fully herein, users may provide biometric data during a registration process. The biometric data may include facial images, retinal scans, fingerprints, and the like. In some examples, the registration data may identify one or more user computing devices that may be accessed by each registered user.

Upon receiving an indication that a user has logged in to a user computing device (e.g., has successfully authenticated and has begun a computing session), passive authentication functions, such as passive biometric authentication processes, may be initiated. In some examples, initiating the passive authentication functions may include retrieving the biometric data of the user that was receiving during registration, activating or enabling one or more biometric data capture devices (e.g., web camera, keyboard with integrated fingerprint scanner, mouse with integrated fingerprint scanner, or the like).

In some examples, as the user performs work functions with the computing session (e.g., performs in the normal course of business) one or more types of biometric data may be captured and compared to the retrieved biometric data (e.g., registration biometric data). If the data matches, additional biometric data may be captured and compared (e.g., the process may continue to capture and compare biometric data). If the data does not match, one or more mitigation actions may be identified and executed.

As discussed herein, in some examples, the biometric data may be captured and analyzed on a continuous or near-continuous basis. Additionally or alternatively, the biometric data may be captured and analyzed on a periodic or aperiodic basis.

These and various other arrangements will be discussed more fully below.

Figure 1B:
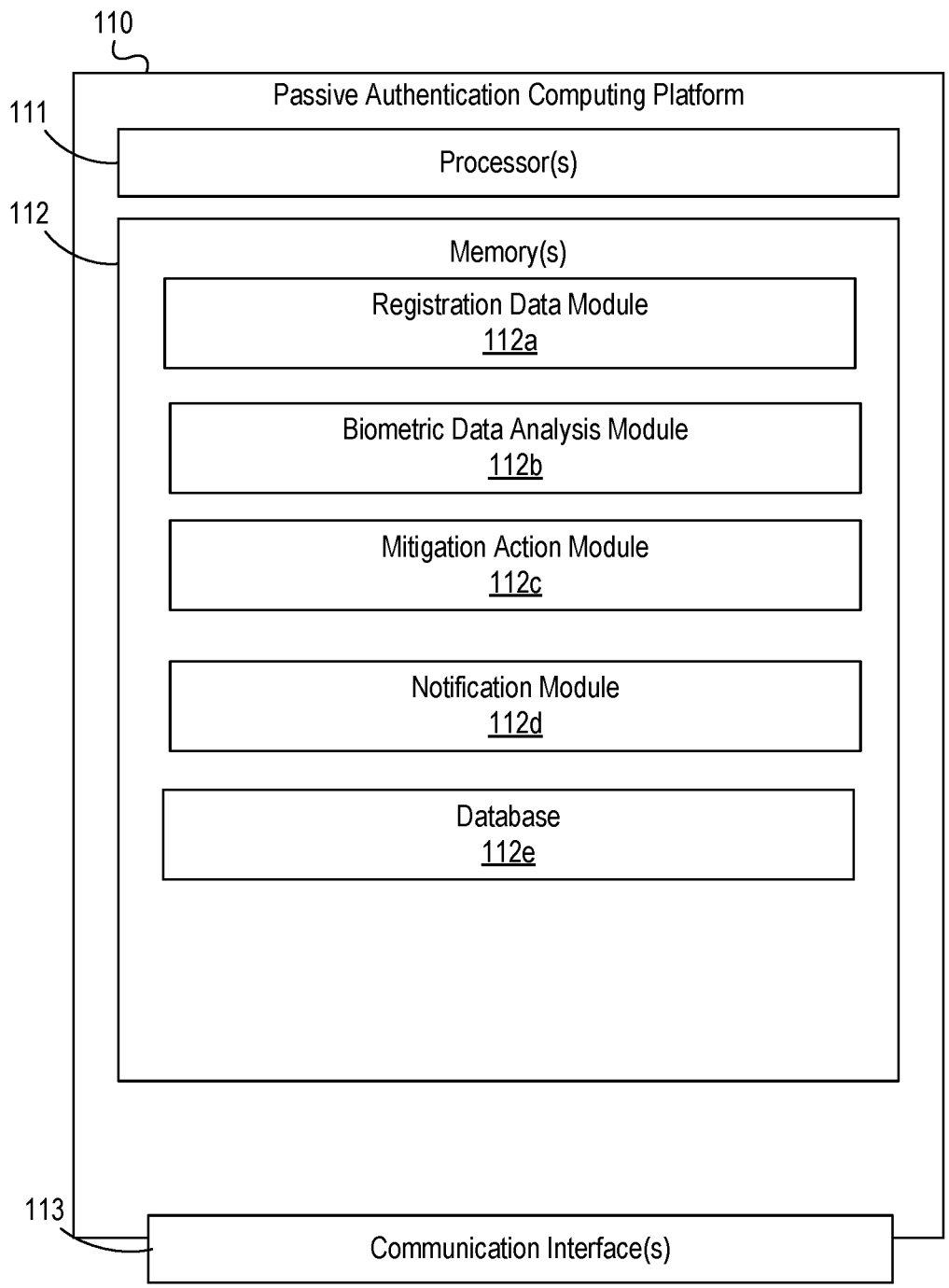

Aspects described herein may be implemented using one or more computing devices operating in a computing environment. For instance, FIGS. 1A-1B depict an illustrative computing environment for implementing passive authentication in accordance with one or more aspects described herein. Referring to FIG. 1A, computing environment 100 may include one or more computing devices and/or other computing systems. For example, computing environment 100 may include passive authentication computing platform 110, internal entity computing system 120, user computing device 140, and/or user computing device 145. Although one internal entity computing system 120 and two user computing devices 140, 145 are shown, any number of systems or devices may be used without departing from the invention.

Passive authentication computing platform 110 may be configured to perform intelligent, dynamic, and efficient passive authentication on a continuous, periodic or aperiodic basis. For instance, passive authentication computing platform 110 may receive registration data from a plurality of users, a plurality of corresponding computing devices, and the like. In some examples, the users and computing devices may be associated with an enterprise organization implementing the passive authentication functions described herein (e.g., users may be employees of the enterprise organization and may use the computing devices in the course of business for the enterprise organization). The registration data may include biometric data of each registered user (e.g., facial image, retinal scan, fingerprint data, and the like), as well as identification of one or more computing devices the user is authorized to use (e.g., based on unique identifier associated with each device). The registration data may be stored for passive authentication.

During the course of use of a computing device, biometric data of the user may be captured. For instance, a web camera may capture an image of a face of a user. Additionally or alternatively, a keyboard associated with a computing device may include an integrated fingerprint scanner on each key to enable capture of a user's fingerprint with each keystroke. In some examples, the keyboard may include an integrated fingerprint scanner under fewer than all keys (e.g., under home keys only, under home keys plus other frequently used keys, under an enter key, or the like). Further, a mouse may include an integrated fingerprint scanner that may be enabled to captured fingerprint data of the user as the user uses the mouse.

The captured biometric data may be received by the passive authentication computing platform 110 and compared to the registration data. If the data matches, the user may be considered passively authenticated and additional biometric data may be captured and analyzed at a later time. If the data does not match, one or more mitigation actions may be identified. For instance, an instruction or command requesting additional authentication data from a user, locking a user out of a computing device, disabling access to one or more enterprise organization systems, or the like may be generated. The generated command or instruction may be transmitted to the impacted computing device or system. In some examples, transmitting the instruction or command may cause the computing device or system to execute the command or instruction, thereby implementing the mitigation action.

In some examples, biometric data of the user may be continuously captured and analyzed. Additionally or alternatively, biometric data may be captured at periodic intervals (e.g., every minute, every two minutes, every thirty seconds, or the like), at aperiodic intervals, or the like. In some examples, one type of biometric data may be captured continuously or at intervals and, if a match is not detected, additional biometric data may be captured and analyzed. For instance, a web camera may continuously or at intervals capture image data of a user and compare it to registration image data. If the data matches, the web camera may continue to capture the image data for analysis. If a match is not detected, the system may initiate capture of fingerprint data from the keyboard and/or mouse associated with the computing device and/or user (e.g., in addition to the additional image data) to confirm that the user is not authenticated (e.g., avoid or limit false positives).

Internal entity computing system 120 may be or include one or more computing devices (e.g., servers, server blades, or the like) and/or one or more computing components (e.g., memory, processor, and the like) and may be associated with or operated by an enterprise organization implementing the passive authentication computing platform 110. The internal entity computing system 120 may host and/or execute one or more systems, applications, or the like, that may be accessed by users associated with the enterprise organization during the course of business. In some examples, if a user is not authenticated via the passive authentication computing platform 110 (e.g., a match between received biometric data and registration biometric data is not detected), in some examples, a mitigation action modifying access to the systems or applications of the internal entity computing system 120 may be generated and sent to the internal entity computing system 120 for execution.

User computing device 140 and/or user computing device 145 may be or include one or more computing devices (e.g., laptops, desktops, mobile devices, tablets, smartphone, and the like) and may be used by one or more users associated with the enterprise organization during the course of business. User computing device 140 and/or user computing device 150 may be registered and associated with one or more users such that, upon login to computing device 140 and/or computing device 145, passive authentication functions (i.e., passive biometric authentication processes) may be initiated, hardware-based biometric data capture devices may be activated or enabled, and the like. For instance, each user computing device 140 and/or 145 may have or include a web camera, keyboard (e.g., integrated or external), mouse (e.g., integrated or external) or the like, that may have biometric data capture capabilities that may be activated or initiated upon login.

As mentioned above, computing environment 100 also may include one or more networks, which may interconnect one or more of passive authentication computing platform 110, internal entity computing system 120, user computing device 140 and/or user computing device 145. For example, computing environment 100 may include network 190. In some examples, network 190 may include a private network associated with the enterprise organization. Network 190 may include one or more sub-networks (e.g., Local Area Networks (LANs), Wide Area Networks (WANs), or the like). Network 190 may be associated with a particular organization (e.g., a corporation, financial institution, educational institution, governmental institution, or the like) and may interconnect one or more computing devices associated with the organization. For example, passive authentication computing platform 110, internal entity computing system 120, user computing device 140 and/or user computing device 145 may be associated with an enterprise organization (e.g., a financial institution), and network 190 may be associated with and/or operated by the organization, and may include one or more networks (e.g., LANs, WANs, virtual private networks (VPNs), or the like) that interconnect passive authentication computing platform 110, internal entity computing system 120, user computing device 140 and/or user computing device 145 and one or more other computing devices and/or computer systems that are used by, operated by, and/or otherwise associated with the organization.

Referring to FIG. 1B, passive authentication computing platform 110 may include one or more processors 111, memory 112, and communication interface 113. A data bus may interconnect processor(s) 111, memory 112, and communication interface 113. Communication interface 113 may be a network interface configured to support communication between passive authentication computing platform 110 and one or more networks (e.g., network 190, network 195, or the like). Memory 112 may include one or more program modules having instructions that when executed by processor(s) 111 cause passive authentication computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of passive authentication computing platform 110 and/or by different computing devices that may form and/or otherwise make up passive authentication computing platform 110.

For example, memory 112 may have, store and/or include registration data module 112a. Registration data module 112a may store instructions and/or data that may cause or enable the passive authentication computing platform 110 to receive registration data from a plurality of users, a plurality of user computing devices 140, 145, and the like. The registration data may include biometric data of each user (e.g., facial images, fingerprint data, retinal scans, or the like). The registration data may be stored in a database, such as database 112e, and retrieved as needed for comparison to received biometric data. In some examples, registration data module 112a may generate and/or transmit one or more user interfaces to one or more user computing devices 140, 145 to capture registration data from each user, and the like.

Passive authentication computing platform 110 may further have, store, and/or include biometric data analysis module 112b. Biometric data analysis module 112b may store instructions and/or data that may cause or enable the passive authentication computing platform 110 to receive biometric data from one or more hardware-based biometric data capture devices associated with each user computing device 140, 145 (e.g., web camera, keyboard with integrated fingerprint scanner in one or more keys, mouse within integrated fingerprint scanner, or the like). The biometric data may be captured continuously as the user interacts with the user computing device, on a periodic basis and/or on an aperiodic basis, and may be transmitted to the passive authentication computing platform 110 for analysis. Biometric data analysis module 112b may compare the received biometric data to stored biometric data captured during a registration process. If the data matches, additional biometric data may be received and analyzed. If the data does not match, one or more mitigation actions may be identified.

Passive authentication computing platform 110 may further have, store and/or include mitigation action module 112c. Mitigation action module 112c may store instructions and/or data that may cause or enable the passive authentication computing platform 110 to identify one or more mitigation actions in response to a mismatch of received biometric data and stored biometric data. For instance, a request for additional authentication may be identified, a lock out of a user from a user computing device may be identified, modification of access or functionality of one or more enterprise organization systems or applications may be identified, and the like. Mitigation action module 112c may generate one or more instructions or commands to execute the mitigation actions that may be sent to an impacted user computing device, internal entity system or the like, for execution.

Passive authentication computing platform 110 may further have, store and/or include notification module 112d. Notification module 112d may store instructions and/or data that may cause or enable passive authentication computing platform 110 to generate one or more notifications based on, for instance, identified mitigation actions. For instance, if a user is locked out of a machine in response to a mismatch of biometric data, a notification may be generated and transmitted for display on user computing device 140 and/or user computing device 145 indicating the machine is locked and the user has to login in again using authentication credentials, wait a predetermined time before logging in, or the like. In another example, notification module 112d may generate a notification requesting additional authentication data from a user in response to a detected mismatch of data. Various other notifications may be generated without departing from the invention.

Passive authentication computing platform 110 may further have, store and/or include a database 112e. Database 112e may store biometric data associated with a plurality of users, registration data of user and user computing devices, and the like.

FIGS. 2A-2E depict one example illustrative event sequence for implementing passive authentication functions in accordance with one or more aspects described herein. The events shown in the illustrative event sequence are merely one example sequence and additional events may be added, or events may be omitted, without departing from the invention. Further, one or more processes discussed with respect to FIGS. 2A-2E may be performed in real-time or near real-time.

Figure 2A:
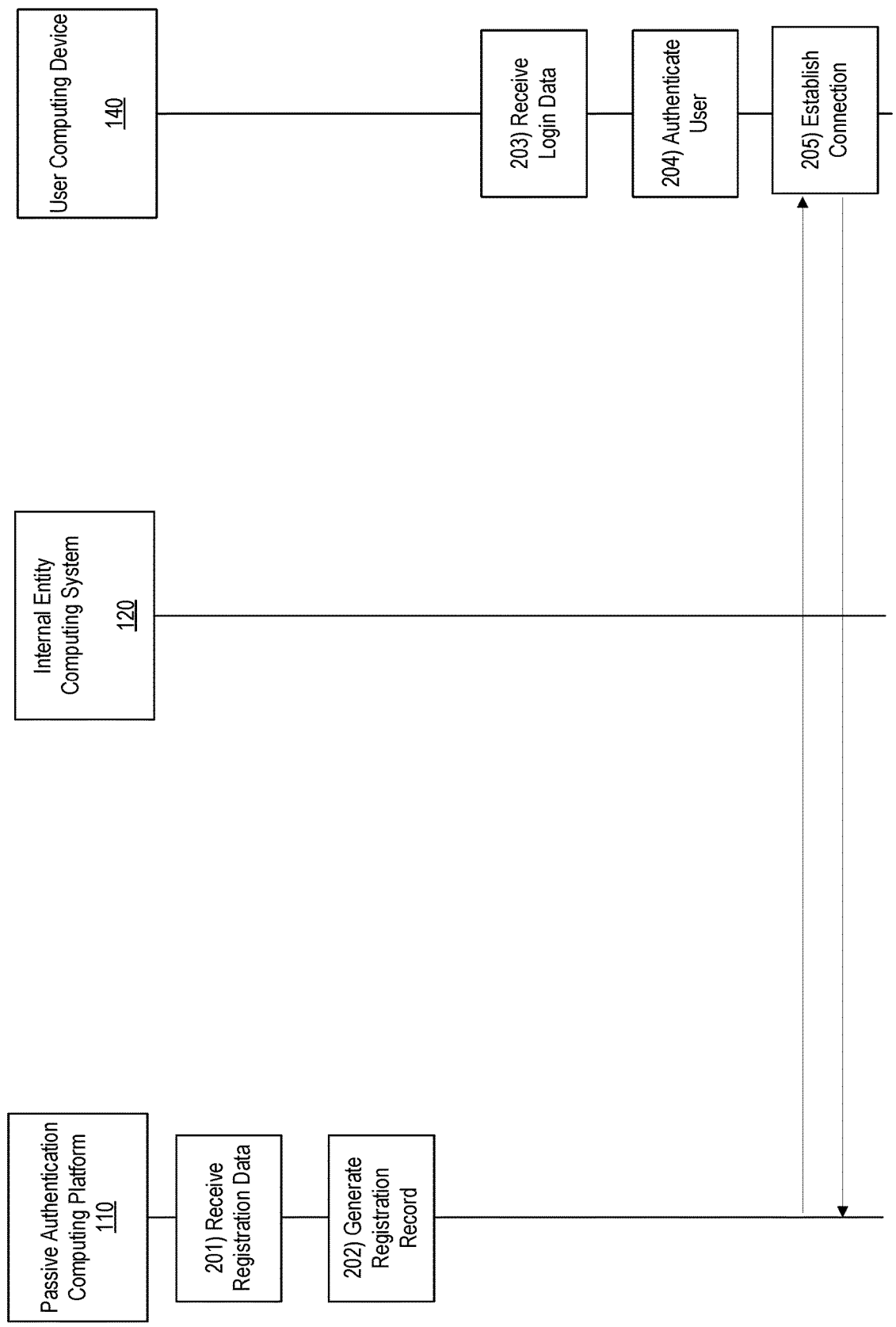
FIGS. 2A-2E depict an illustrative event sequence for implementing passive authentication in accordance with one or more aspects described herein.

With reference to FIG. 2A, at step 201, passive authentication computing platform 110 may receive registration data. For instance, passive authentication computing platform 110 may receive registration data from a plurality of users, a plurality of user computing devices, and the like. The registration data may include biometric data of each user (e.g., facial image, fingerprint, retinal scan, or the like) and/or identification of one or more user computing devices associated with each user or which each user is authorized to operate.

At step 202, the registration data may be stored and a registration record may be generated. For instance, a database may be modified to include entries for each user for which registration data was received, each user computing device, and the like.

At step 203, login data may be received by user computing device 140. For instance, a user may initiate login by inputting credentials, such as a username and password, personal identification number, biometric data, or the like. In response to receiving the login data, the user may be authenticated at step 204. For instance, the login data may be compared to pre-stored data associated with a user and, if the data matches, the user may be authenticated and granted access to user computing device 140.

At step 205, user computing device 140 may connect to passive authentication computing platform 110. For instance, a first wireless connection may be established between user computing device 140 and passive authentication computing platform 110. Upon establishing the first wireless connection, a communication session may be initiated between user computing device 140 and passive authentication computing platform 110.

Figure 2B:
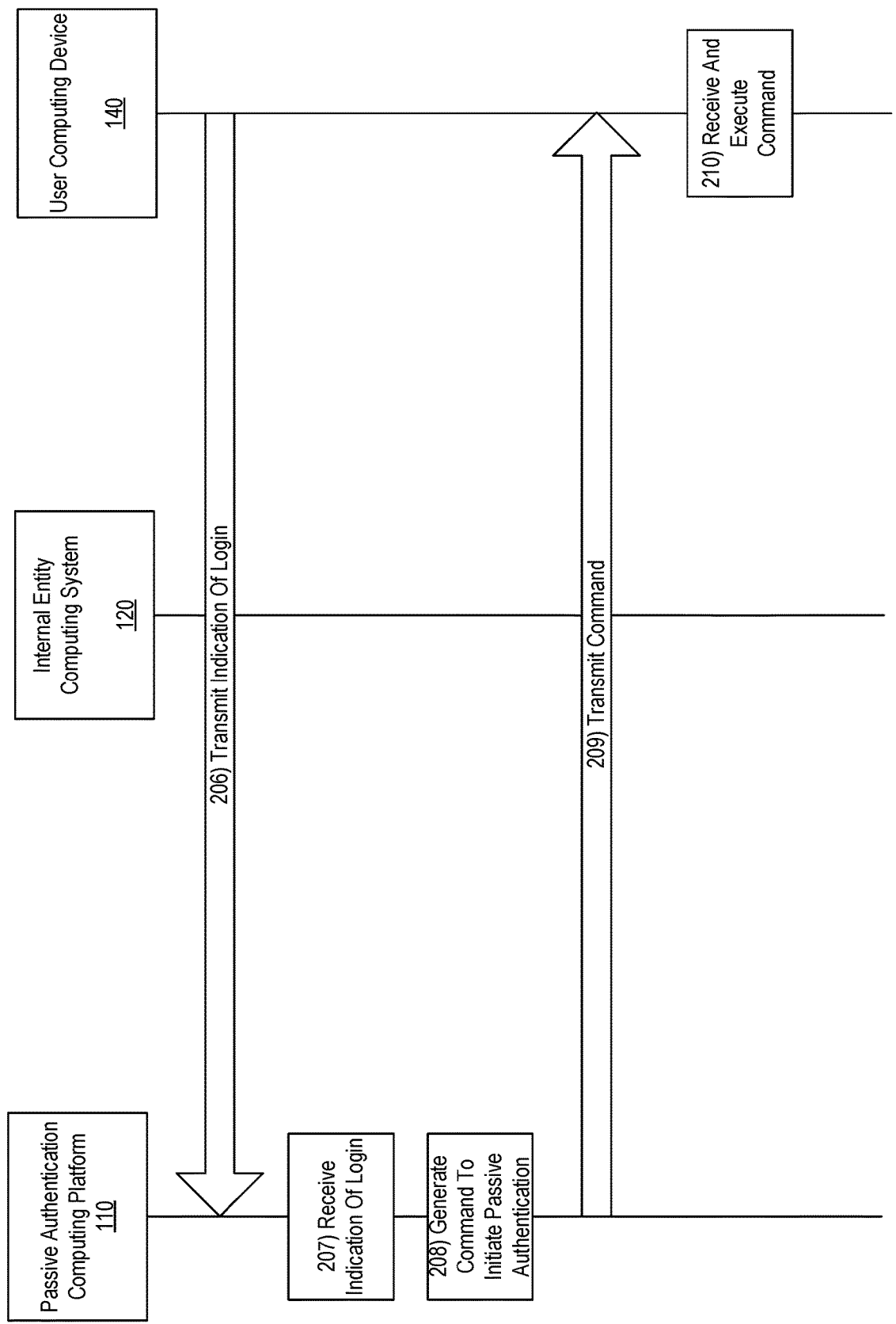

With reference to FIG. 2B, at step 206, user computing device 140 may transmit or send an indication of login/authentication to passive authentication computing platform 110. For instance, user computing device 140 may transmit or send the indication of login/authentication during the communication session initiated upon establishing the first wireless connection.

At step 207, passive authentication computing platform 110 may receive the indication of login/authentication.

At step 208, in response to receiving the indication of login/authentication, passive authentication computing platform 110 may generate a command or instruction to initiate passive authentication or passive biometric authentication processes. For instance, passive authentication computing platform 110 may generate a command or instruction causing one or more hardware-based biometric data collection devices to be activated or enabled.

At step 209, passive authentication computing platform 110 may transmit or send the generated command or instruction to the user computing device 140. In some examples, transmitting or sending the instruction or command may cause the instruction or command to be automatically executed by the user computing device 140.

At step 210, user computing device 140 may receive the command or instruction and may execute the instruction or command. In some examples, executing the instruction or command may cause one or more hardware-based biometric data collection devices to be activated or enabled. For instance, a web camera may be activated, enabled or powered on, one or more integrated fingerprint scanners in a mouse and/or keyboard may be activated or enabled, or the like.

Figure 2C:
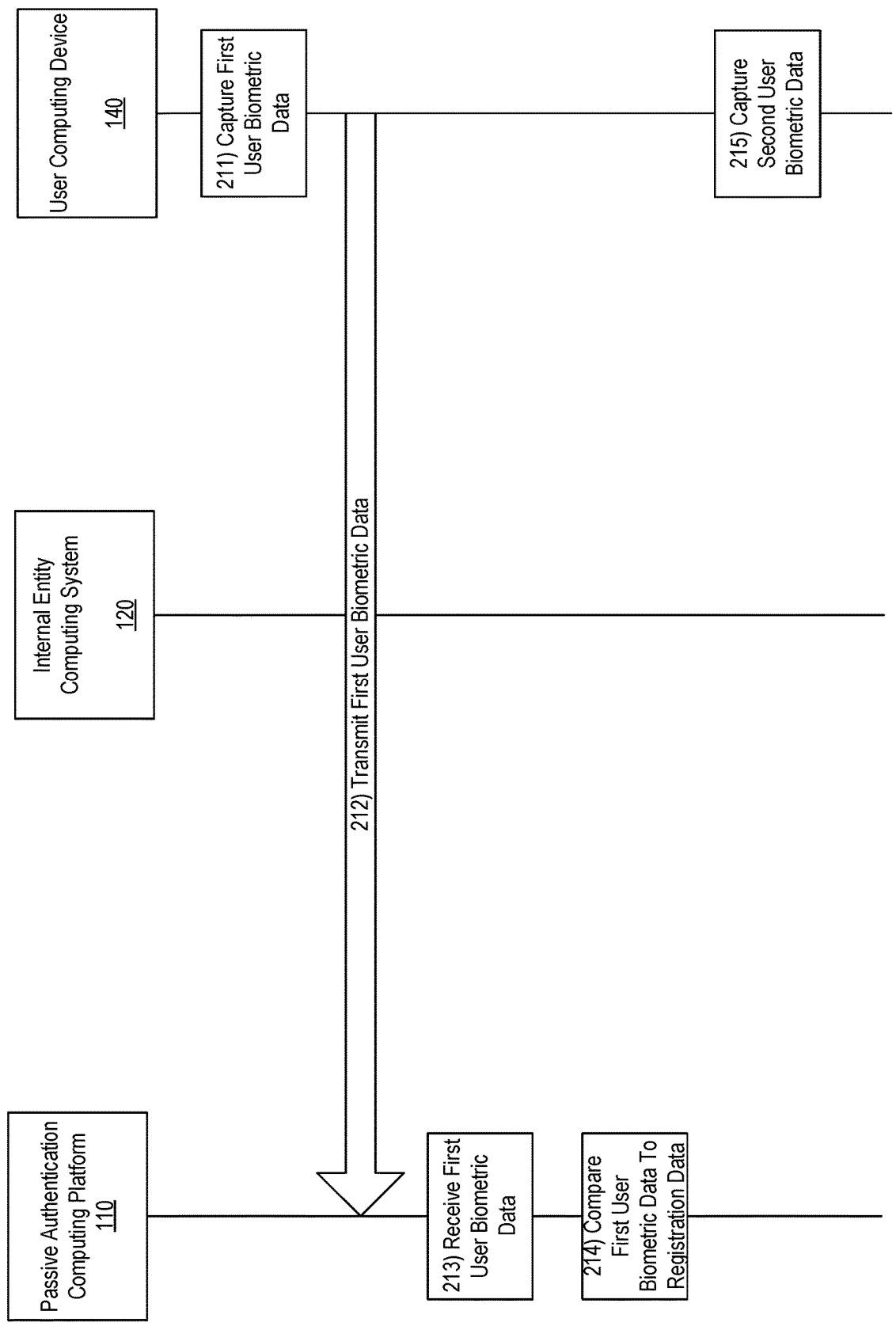

With reference to FIG. 2C, at step 211, user computing device 140 may capture first biometric data. For instance, one or more of the hardware-based biometric data capture devices may capture biometric data (e.g., facial image, fingerprint, retinal scan, or the like) of a user using user computing device 140 and the first biometric data may be received by the user computing device 140. In some examples, the first biometric data may be captured at a first time.

At step 212, the user computing device 140 may transmit or send the first biometric data to the passive authentication computing platform 110.

At step 213, passive authentication computing platform 110 may receive the first biometric data and may process and/or analyze the data.

At step 214, the first biometric data may be compared to the biometric data received at registration for an identified user. For instance, the first biometric data may be compared to a corresponding type of biometric data received during the registration process (e.g., fingerprint compared to fingerprint, and the like). In some examples, the first biometric data may include more than one type of biometric data.

If, at step 214, the first biometric data matches the biometric data received at registration, the process may continue at step 215. If the first biometric data does not match the biometric data received at registration, the process may continue at step 219.

At step 215, second biometric data of the user may be captured. For instance, one or more types of biometric data of the user may be captured via the one or more hardware-based biometric data capture devices at a second time after or subsequent to the first time. In some examples, biometric data may be continuously captured and transmitted for analysis. Additionally or alternatively, biometric data may be captured at periodic or aperiodic intervals.

Figure 2D:
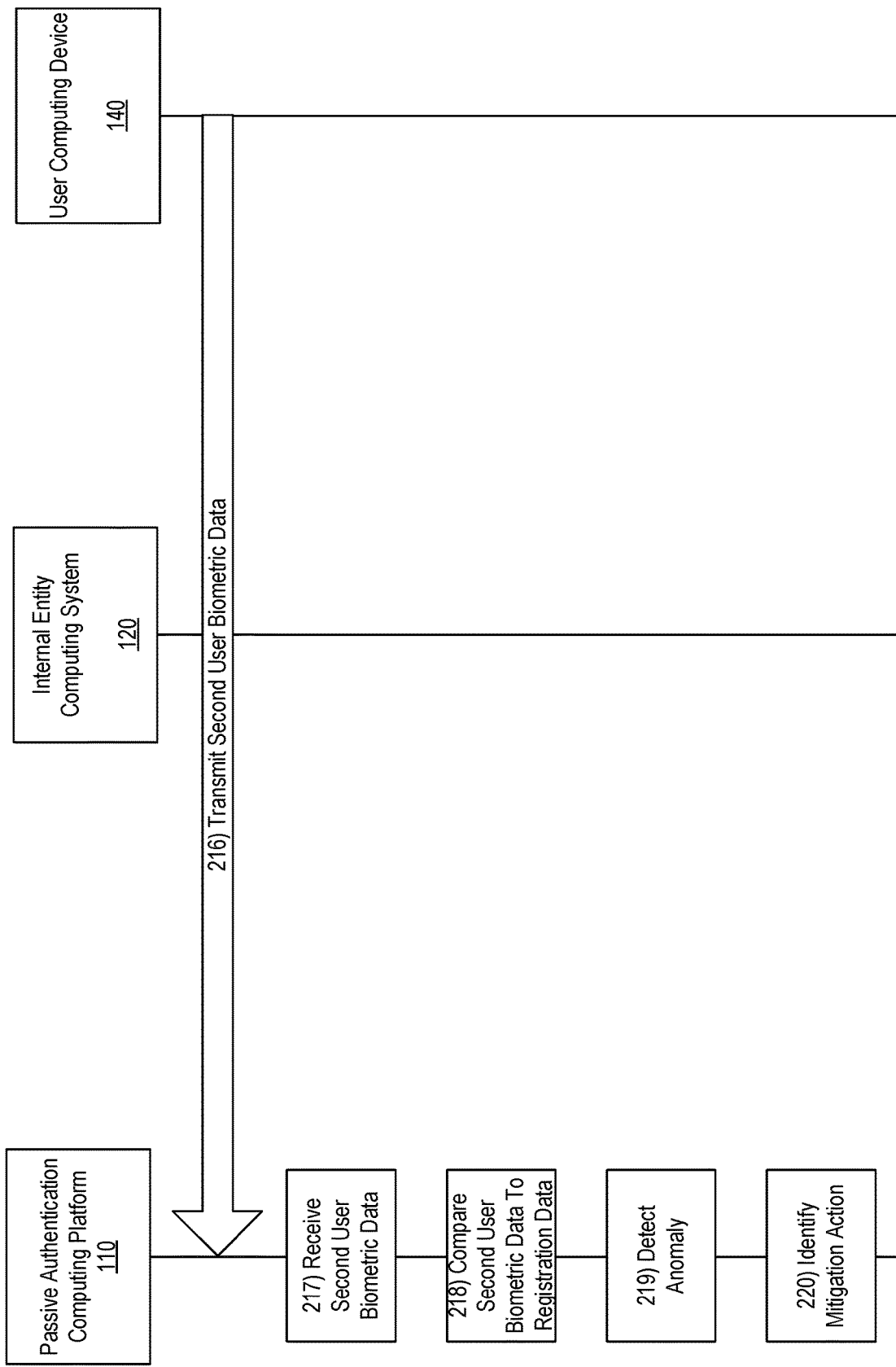

With reference to FIG. 2D, at step 216, the user computing device 140 may transmit or send the second biometric data to the passive authentication computing platform 110 for analysis.

At step 217, passive authentication computing platform 110 may receive the second biometric data and process and/or analyze the second biometric data.

At step 218, passive authentication computing platform 110 may compare the second biometric data to the registration data to determine whether a match occurs. If a match occurs, the process may continue to capture and receive biometric data for analysis. If a match does not occur, at step 219, an anomaly may be detected (e.g., mismatch between one or more types of received biometric data and biometric data received at registration).

In response to detecting an anomaly, at step 220, one or more mitigation actions may be identified. For instance, mitigation actions such as a request for additional authentication information, a lockout of a user from an impacted user computing device 140, initiation or activation of additional hardware-based biometric data capture devices to perform additional passive authentication, and the like may be identified.

Figure 2E:
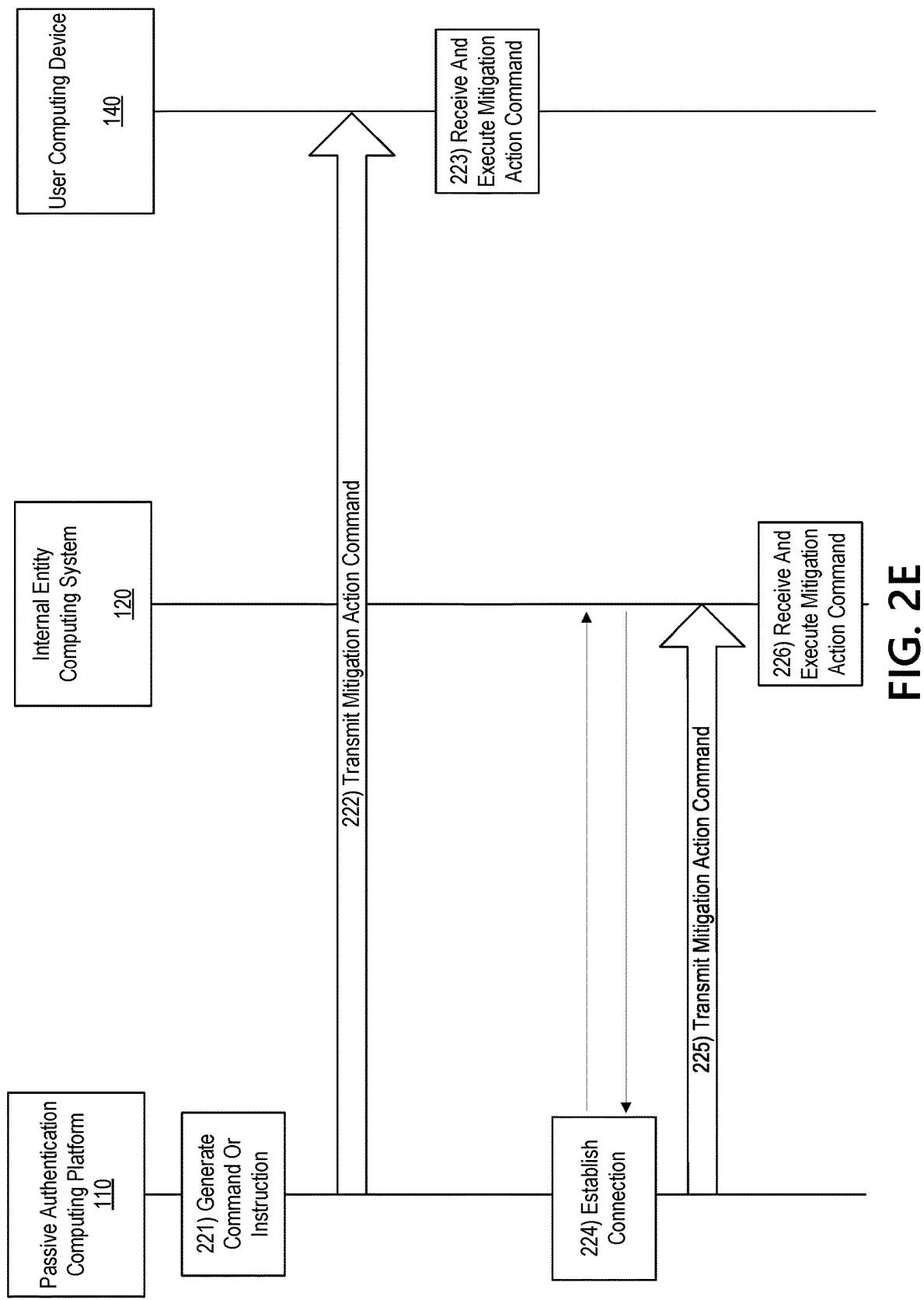

With reference to FIG. 2E, at step 221, a command or instruction to execute the identified one or more mitigation actions may be generated by the passive authentication computing platform 110. For instance, a command or instructions that, when received by the user computing device 140, may be automatically executed to cause implementation of the one or more mitigation actions may be generated.

At step 222, the passive authentication computing platform 110 may transmit or send the generated mitigation action or command to the user computing device 140. At step 223, the user computing device 140 may receive and execute the mitigation action command or instructions. For instance, in some examples, transmitting or sending the command or instruction may cause the user computing device 140 to automatically execute the command or instruction, thereby implementing or executing the one or more mitigation actions.

In some examples, the one or more mitigation actions may include modifying access to or functionality of other enterprise organization systems. For instance, the one or more mitigation actions may include limited or denying access to one or more systems, devices, applications, or the like, associated with an enterprise organization system, such as internal entity computing system 120. Accordingly, in those examples, at step 224, passive authentication computing platform 110 may connect to internal entity computing system 120. For instance, a second wireless connection may be established between passive authentication computing platform 110 and internal entity computing system 120. Upon establishing the second wireless connection, a communication session may be initiated between passive authentication computing platform 110 and internal entity computing system 120.

At step 225, the one or more mitigation action commands or instructions may be transmitted or sent to the internal entity computing system 120. For instance, the instruction or command may be transmitted or sent during the communication session initiated upon establishing the second wireless connection.

At step 226, the internal entity computing system 120 may receive and execute the command or instruction. For instance, transmitting or sending the instruction or command may cause the internal entity computing system 120 to automatically execute the instruction or command, thereby implementing the one or more mitigation actions.

Figure 3:
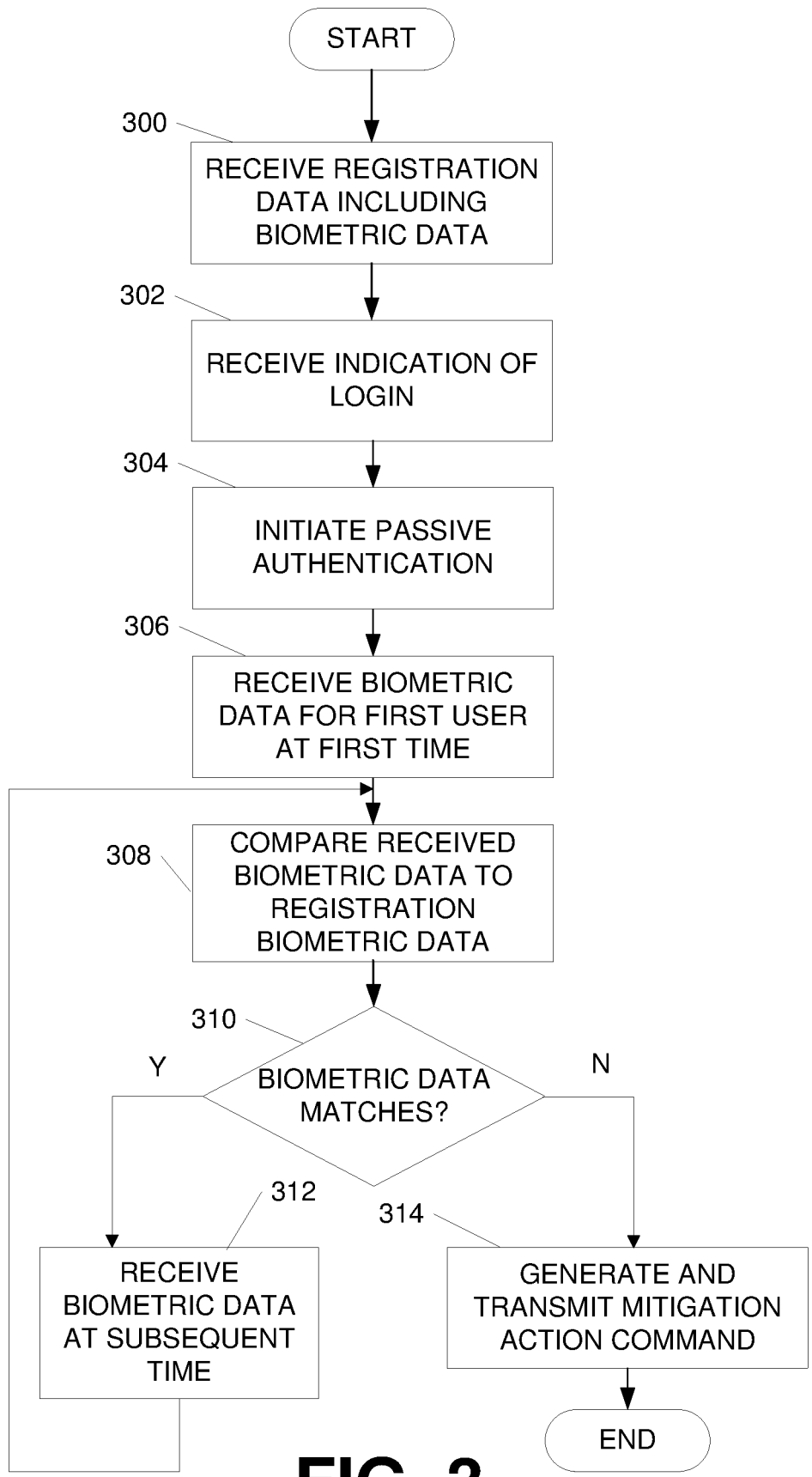
FIG. 3 illustrates an illustrative method for implementing passive authentication according to one or more aspects described herein.

FIG. 3 is a flow chart illustrating one example method of implementing passive authentication functions in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, registration data for a plurality of users may be received. For instance, registration data for a plurality of users associated with an enterprise organization may be received by passive authentication computing platform 110. The registration data may include biometric data of each user of the plurality of users (e.g., facial images, retinal scans, fingerprints, and the like) captured with permission of the user. The registration data may further include identification of one or more computing devices that each user is authorized to access (e.g., during the course of business for the enterprise organization).

At step 302, an indication of login at a user computing device by a first user may be received. For instance, a first user may provide login credentials to a user computing device to access the user computing device. Upon being authenticated to the user computing device, an indication that the first user successfully logged into the user computing device may be received by the passive authentication computing platform 110 and from the user computing device 140.

In response to receiving the indication of login, at step 304, passive authentication functions may be initiated. For instance, a command or instruction causing activation or initiation of one or more hardware-based biometric data collection devices may be generated and transmitted to the user computing device 140. For instance, an instruction or command causing a web camera to activate and capture image data, causing a keyboard with integrated fingerprint scanners in one or more keys to be initiated or activated, causing a mouse with an integrated fingerprint scanner to be activated, or the like, may be generated and transmitted to the user computing device 140. Transmitting the command or instruction to the user computing device 140 may cause the user computing device 140 to automatically execute the command or instruction.

At step 306, biometric data captured at a first time by the activated one or more hardware-based biometric data collection devices may be received by the passive authentication computing platform 110. For instance, an image of a user captured by a web camera, a fingerprint from a keyboard, or the like, may be received by the passive authentication computing platform 110.

At step 308, the received biometric data captured at the first time may be compared to the biometric data associated with the first user and received with the registration data to determine whether the received biometric data matches the biometric data associated with the first user and received with the registration data.

At step 310, if the received biometric data matches the registration biometric data of the first user, the process may proceed to step 312 where additional biometric data may be captured at a second or subsequent time. For instance, the system may continue to passively capture (e.g., without user input or action outside of normal business functions) authentication data at additional times (e.g., continuously, periodically, aperiodically, or the like). The process may then return to step 308 where the subsequently received biometric data may be compared to registration data to again authenticate the user (e.g., confirm a same user is still using or operating the user computing device 140).

If, at step 310, the received biometric data does not match the registration biometric data of the first user, one or more mitigation actions may be identified and one or more commands or instructions to execute the one or more mitigation actions may be generated and transmitted to the user computing device 140 for execution. For instance, mitigations actions such as a request for additional authentication data from the user, a command to lock the first user out of the user computing device 140, an instruction to passively capture additional biometric data, or the like may be identified and executed by the user computing device 140.

FIG. 4 illustrates one example user interface 400 that may be displayed by a display of user computing device 140 in response to failure to match received biometric data to registration biometric data in accordance with one or more aspects described herein. The user interface 400 includes a request for the user to input authentication credentials (e.g., the user may be locked out of the user computing device 140 and may have to re-input authentication credentials to regain access to the user computing device 140).

FIG. 5 illustrates another example user interface 500 that may be displayed by a display of user computing device 140 in response to failure to match received biometric data to registration data in accordance with one or more aspects described herein. The user interface 500 may indicate that passive authentication failed and that additional biometric data is being captured by the one or more hardware-based biometric collection devices.

As discussed herein, aspects described are directed to passive authentication of users to ensure that a user who initiated a computing session on a user computing device continues to operate that user computing device throughout the computing session. As discussed, by capturing biometric data throughout the computing session (e.g., on a continuous basis, periodic basis, aperiodic basis, or the like), the system may ensure that authorized users are accessing the user computing device.

As discussed, the biometric data of the user may be captured and analyzed on a continuous basis (e.g., facial image of user may be continuously captured by web camera and compared to image data received at registration, fingerprint data may be captured from a plurality of keystroke or each keystroke and compared to fingerprint data received at registration, and the like). Additionally or alternatively, biometric data may be captured on a periodic basis (e.g., every 30 seconds, every minute, or the like) to conserve computing power and resources in situations where that is a goal. Further, in some examples, the biometric data may be captured on an aperiodic basis (e.g., after 30 seconds then again after 75 seconds then again after another 40 seconds, or the like). Capturing data on an aperiodic basis may avoid unauthorized actors predicting when the biometric data may be captured.

In some examples, more than one or all types of biometric data may be captured and analyzed to passively authenticate the user. In some arrangements, one type of biometric data may be captured and analyzed and, if an issue arises (e.g., captured biometric data does not match registration biometric data) capture of additional type(s) of biometric data may be initiated. For instance, if facial image data is captured to passively authenticate the user and, at some point, a captured image does not match the registration data, fingerprint capture may be initiated to confirm whether an issue has occurred. Accordingly, this may aid in reducing or eliminating identification of false positives.

In some examples, a change in captured biometric data may also initiate one or more mitigation actions. For instance, if a different face or fingerprint is detected, the system may generate and display a pop-up asking the user to authenticate using their credentials. Once authenticated, the passive authentication may continue for the newly detected user.

As discussed herein, if received biometric data does not match registration biometric data for a particular user, one or more mitigation actions may be identified and executed. For instance, the user may be locked out of the user computing device and/or may be required to again input authentication credentials. In some examples, a time out period may be used and the user may be required to wait a predetermined time (e.g., 5 minutes, 10 minutes, 30 minutes, or the like) before login credentials can be input to re-authenticate.

In some examples, two failures of passive authentication may be required before the user is locked out of the machine. For instance, if a first type of biometric data does not match, a second type may be captured and analyzed. If the second type also does not match, a lock out may be executed.

In some examples, a one-time passcode (OTP) may be transmitted to a registered user device (e.g., mobile device of the user) and may be used to confirm authentication of the user as a mitigation action. The user may provide a phone number, email address, or other device identifier during registration and the OTP may be sent to the phone number or email address. The user may then be requested to input the OTP into a generated user interface displayed on the user computing device in order to continue the computing session.

In some arrangements, multiple users may access a same user computing device. For instance, a call or customer service center may have 24 hour coverage and may operate more than one shift of work. Accordingly, more than one user may operate each computing device. In these arrangements, multiple users may be authorized to access each user computing device and, upon login, the system may identify and retrieve biometric data from registration data of a user that has logged in in order to initiate the passive authentication functions.

In some examples, a bypass or override may be provided. For instance, if an information technology support professional is accessing a machine (e.g., using a keyboard or mouse, or the like) a bypass for, for instance, a predetermined amount of time may be used to avoid a lockout at the user computing device. For instance, a bypass of passive authentication functions for a period of time (e.g., 15 minutes, 30 minutes, or the like) may be executed and, in that time, biometric data of the user of the user computing device might not be captured and analyzed, to enable the support professional to address the issue.

In another example, some users may be authorized to access any machine and detection of one of those users might not prompt a mitigation action (e.g., system administrators).

In addition to ensuring authorized users are accessing devices, the arrangements described herein may enable logging of keystroke data, mouse data, and the like, in order to detect unauthorized activity, track a user to performed unauthorized activity, or the like. Further, upon detection of an issue (e.g., biometric data mismatch) a notification may be sent to a system administrator and the detected mismatch may be logged.

As discussed, the arrangements described herein may further reduce or eliminate the use of proxy workers or other unauthorized subcontractors. For instance, in some examples, user may provide a user computing device and the user's authentication credentials to another user (e.g., another user not authorized by the enterprise organization) to perform the user's work. This proxy worker or unauthorized subcontractor work can be difficult for enterprise organizations to monitor and control with conventional authentication systems. However, the arrangements provided herein rely on biometric data of a user captured throughout a computing session which would make the use of proxy workers or unauthorized subcontractors difficult or impossible.

Figure 6:
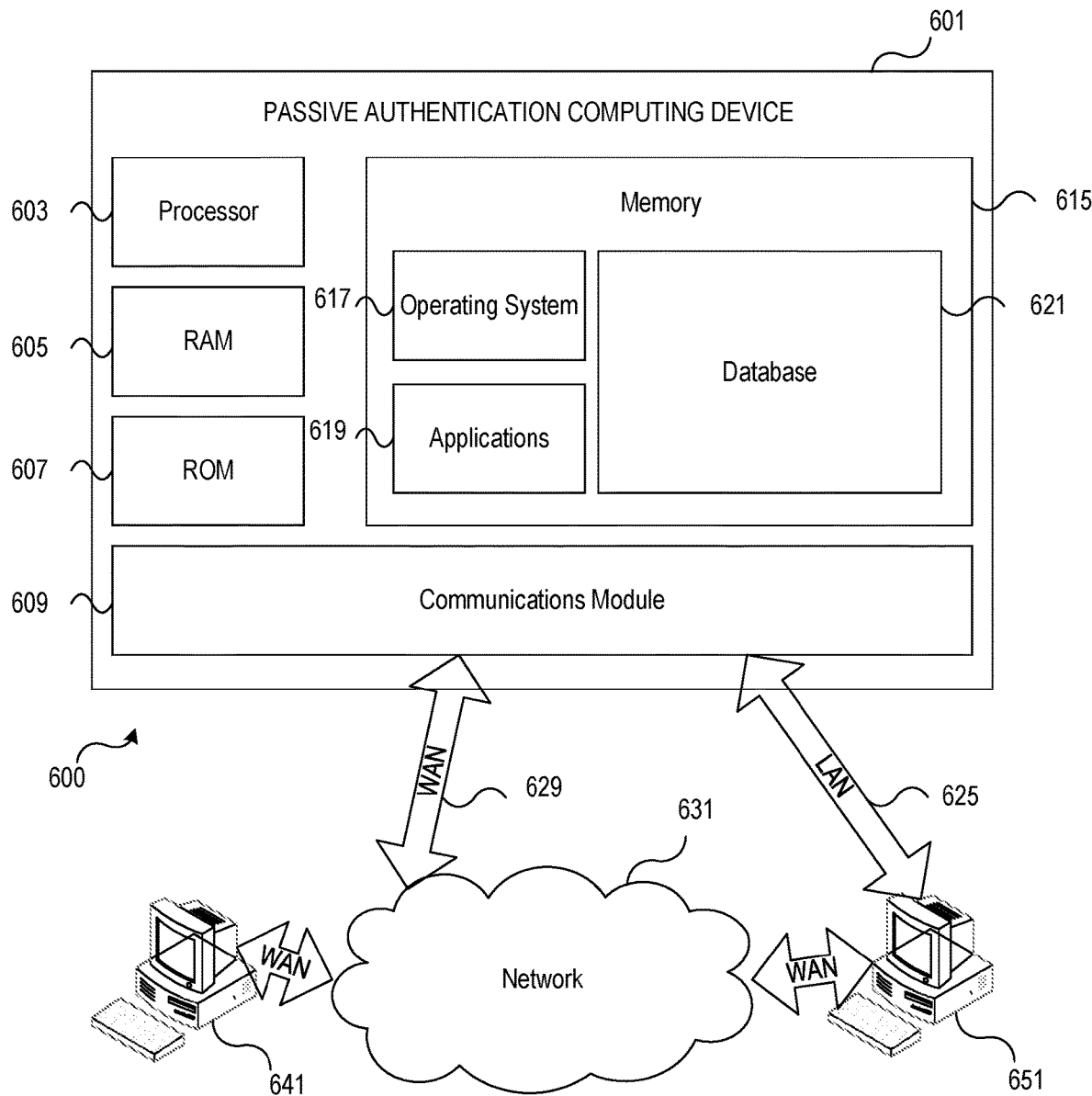
FIG. 6 illustrates one example environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include passive authentication computing device 601 having processor 603 for controlling overall operation of passive authentication computing device 601 and its associated components, including Random Access Memory (RAM) 605, Read-Only Memory (ROM) 607, communications module 609, and memory 615. Passive authentication computing device 601 may include a variety of computer readable media. Computer readable media may be any available media that may be accessed by passive authentication computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by passive authentication computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on passive authentication computing device 601. Such a processor may execute computer-executable instructions stored on a computer-readable medium.

Software may be stored within memory 615 and/or storage to provide instructions to processor 603 for enabling passive authentication computing device 601 to perform various functions as discussed herein. For example, memory 615 may store software used by passive authentication computing device 601, such as operating system 617, application programs 619, and associated database 621. Also, some or all of the computer executable instructions for passive authentication computing device 601 may be embodied in hardware or firmware. Although not shown, RAM 605 may include one or more applications representing the application data stored in RAM 605 while passive authentication computing device 601 is on and corresponding software applications (e.g., software tasks) are running on passive authentication computing device 601.

Communications module 609 may include a microphone, keypad, touch screen, and/or stylus through which a user of passive authentication computing device 601 may provide input, and may also include one or more of a speaker for providing audio output and a video display device for providing textual, audiovisual and/or graphical output. Computing system environment 600 may also include optical scanners (not shown).

Passive authentication computing device 601 may operate in a networked environment supporting connections to one or more remote computing devices, such as computing device 641 and 651. Computing devices 641 and 651 may be personal computing devices or servers that include any or all of the elements described above relative to passive authentication computing device 601.

The network connections depicted in FIG. 6 may include Local Area Network (LAN) 625 and Wide Area Network (WAN) 629, as well as other networks. When used in a LAN networking environment, passive authentication computing device 601 may be connected to LAN 625 through a network interface or adapter in communications module 609. When used in a WAN networking environment, passive authentication computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   a memory storing computer-readable instructions that, when executed by the at least one processor, cause the computing platform to:
   receive registration data for a plurality of users, the registration data including biometric data of each user of the plurality of users, wherein the plurality of users includes at least a first user and wherein the biometric data of each user includes at least two different types of biometric data of each user;
   receive an indication of a login by the first user of the plurality of users on a computing device;
   initiate, in response to the indication of the login by the first user, passive biometric authentication processes, wherein initiating passive biometric authentication processes includes activating a first hardware-based biometric data collection device to collect a first type of biometric data of the at least two different types of biometric data;
   receive, from the first hardware-based biometric data collection device, first biometric data of the first user captured at a first time, wherein the first biometric data is the first type of biometric data of the at least two different types of biometric data;
   compare the received first biometric data of the first user to the biometric data of the registration data associated with the first user;
   responsive to determining that the received first biometric data matches the biometric data of the registration data associated with the first user, receive, from the first hardware-based biometric data collection device, second biometric data captured at a second time subsequent to the first time, wherein the second biometric data is the first type of biometric data of the at least two different types of biometric data; and
   responsive to determining that the received first biometric data does not match the biometric data of the registration data associated with the first user, transmit a first mitigation command to the computing device, wherein transmitting the first mitigation command to the computing device causes the computing device to execute the first mitigation command and wherein the first mitigation command includes:
     activating a second hardware-based biometric data collection device to collect a second type of biometric data of the at least two different types of biometric data;
     receiving, from the second hardware-based biometric data collection device, third biometric data of the first user captured at third time subsequent to the first time, wherein the third biometric data is the second type of biometric data of the at least two different types of biometric data;
     comparing the received third biometric data of the first user to the biometric data of the registration data associated with the first user;
     responsive to determining that the received third biometric data matches the biometric data of the registration data associated with the first user, receive, from the first hardware-based biometric data collection device, fourth biometric data captured at a fourth time subsequent to the third time, wherein the fourth biometric data is the first type of biometric data of the at least two different types of biometric data; and
     responsive to determining that the received third biometric data does not match the biometric data of the registration data associated with the first user, transmit a second mitigation command different from the first mitigation command to the computing device, wherein transmitting the second mitigation command to the computing device causes the computing device to execute the second mitigation command.

2. The computing platform of claim 1, wherein the first type of biometric data includes one of: facial images, fingerprint data or retinal scan data.

3. The computing platform of claim 1, wherein the first hardware-based biometric data collection device includes one of: a web camera, a keyboard or a mouse and the second hardware-based biometric data collection device includes another of: the web camera, the keyboard or the mouse.

4. The computing platform of claim 3, wherein the keyboard includes an integrated fingerprint scanner on a plurality of keys of the keyboard.

5. The computing platform of claim 3, wherein the keyboard includes an integrated fingerprint scanner on each key of the keyboard.

6. The computing platform of claim 3, wherein the mouse includes an integrated fingerprint scanner.

7. The computing platform of claim 1, wherein the second mitigation command includes a request for additional authentication information.

8. The computing platform of claim 1, wherein the second mitigation command includes a command to lock the first user out of the computing device.

9. The computing platform of claim 1, wherein the first type of biometric data is captured by the first hardware-based biometric data collection device on a continuous basis.

10. The computing platform of claim 1, wherein the first type of biometric data is captured by the first hardware-based biometric data collection device on a periodic basis.

11. The computing platform of claim 1, wherein the first type of biometric data is captured by the first hardware-based biometric data collection device on an aperiodic basis.

12. A method, comprising:
receiving, by a computing platform, the computing platform having at least one processor and memory, registration data for a plurality of users, the registration data including biometric data of each user of the plurality of users, wherein the plurality of users includes at least a first user and wherein the biometric data of each user includes at least two different types of biometric data of each user;
receiving, by the at least one processor, an indication of a login by the first user of the plurality of users on a computing device;
initiate, by the at least one processor and in response to the indication of the login by the first user, passive biometric authentication processes, wherein initiating passive biometric authentication processes includes activating a first hardware-based biometric data collection device to collect a first type of biometric data of the at least two different types of biometric data;
receiving, by the at least one processor and from the first hardware-based biometric data collection device, first biometric data of the first user captured at a first time, wherein the first biometric data is the first type of biometric data of the at least two different types of biometric data;
comparing, by the at least one processor, the received first biometric data of the first user to the biometric data of the registration data associated with the first user;
responsive to determining that the received first biometric data matches the biometric data of the registration data associated with the first user, receiving, by the at least one processor and from the first hardware-based biometric data collection devices, second biometric data captured at a second time subsequent to the first time, wherein the second biometric data is the first type of biometric data of the at least two different types of biometric data; and
responsive to determining that the received first biometric data does not match the biometric data of the registration data associated with the first user, transmitting, by the at least one processor, a first mitigation command to the computing device, wherein transmitting the first mitigation command to the computing device causes the computing device to execute the first mitigation command and wherein the first mitigation command includes:
activating, by the at least one processor, a second hardware-based biometric data collection device to collect a second type of biometric data of the at least two different types of biometric data;
receiving, by the at least one processor and from the second hardware-based biometric data collection device, third biometric data of the first user captured at third time subsequent to the first time, wherein the third biometric data is the second type of biometric data of the at least two different types of biometric data;
comparing, by the at least one processor, the received third biometric data of the first user to the biometric data of the registration data associated with the first user;
responsive to determining that the received third biometric data matches the biometric data of the registration data associated with the first user, receiving, by the at least one processor and from the first hardware-based biometric data collection device, fourth biometric data captured at a fourth time subsequent to the third time, wherein the fourth biometric data is the first type of biometric data of the at least two different types of biometric data; and
responsive to determining that the received third biometric data does not match the biometric data of the registration data associated with the first user, transmitting, by the at least one processor, a second mitigation command different from the first mitigation command to the computing device, wherein transmitting the second mitigation command to the computing device causes the computing device to execute the second mitigation command.

13. The method of claim 12, wherein the first type of biometric data of the first user includes one of: facial images, fingerprint data or retinal scan data.

14. The method of claim 12, wherein the first hardware-based biometric data collection device includes one of: a web camera, a keyboard or a mouse and the second hardware-based biometric data collection device includes another of: the web camera, the keyboard or the mouse.

15. The method of claim 14, wherein the keyboard includes an integrated fingerprint scanner on a plurality of keys of the keyboard.

16. The method of claim 14, wherein the mouse includes an integrated fingerprint scanner.

17. The method of claim 12, wherein the second mitigation command includes a request for additional authentication information.

18. The method of claim 12, wherein the second mitigation command includes a command to lock the first user out of the computing device.

19. One or more non-transitory computer-readable media storing instructions that, when executed by a computing platform comprising at least one processor, memory, and a communication interface, cause the computing platform to:
receive registration data for a plurality of users, the registration data including biometric data of each user of the plurality of users, wherein the plurality of users includes at least a first user and wherein the biometric data of each user includes at least two different types of biometric data of each user;

receive an indication of a login by the first user of the plurality of users on a computing device;

initiate, in response to the indication of the login by the first user, passive biometric authentication processes, wherein initiating passive biometric authentication processes includes activating a first hardware-based biometric data collection device to collect a first type of biometric data of the at least two different types of biometric data;

receive, from the first hardware-based biometric data collection device, first biometric data of the first user captured at a first time, wherein the first biometric data is the first type of biometric data of the at least two different types of biometric data;

compare the received first biometric data of the first user to the biometric data of the registration data associated with the first user;

responsive to determining that the received first biometric data matches the biometric data of the registration data associated with the first user, receive, from the first hardware-based biometric data collection devices, second biometric data captured at a second time subsequent to the first time wherein the second biometric data is the first type of biometric data of the at least two different types of biometric data; and responsive to determining that the received first biometric data does not match the biometric data of the registration data associated with the first user, transmit a first mitigation command to the computing device, wherein transmitting the first mitigation command to the computing device causes the computing device to execute the first mitigation command and wherein the first mitigation command includes:

activating a second hardware-based biometric data collection device to collect a second type of biometric data of the at least two different types of biometric data;

receiving, from the second hardware-based biometric data collection device, third biometric data of the first user captured at third time subsequent to the first time, wherein the third biometric data is the second type of biometric data of the at least two different types of biometric data;

comparing the received third biometric data of the first user to the biometric data of the registration data associated with the first user;

responsive to determining that the received third biometric data matches the biometric data of the registration data associated with the first user, receive, from the first hardware-based biometric data collection device, fourth biometric data captured at a fourth time subsequent to the third time, wherein the fourth biometric data is the first type of biometric data of the at least two different types of biometric data; and responsive to determining that the received third biometric data does not match the biometric data of the registration data associated with the first user, transmit a second mitigation command different from the first mitigation command to the computing device, wherein transmitting the second mitigation command to the computing device causes the computing device to execute the second mitigation command.

20. The one or more non-transitory computer-readable media of claim 19, wherein the first type of biometric data is captured by the first hardware-based biometric data collection device on a continuous basis.

* * * * *